US012071856B2

(12) United States Patent
Morliere et al.

(10) Patent No.: US 12,071,856 B2
(45) Date of Patent: Aug. 27, 2024

(54) ASSEMBLY FOR A TURBOMACHINE TURBINE

(71) Applicant: SAFRAN AIRCRAFT ENGINES, Paris (FR)

(72) Inventors: Simon Nicolas Morliere, Moissy-Cramayel (FR); Stéphane Pierre Guillaume Blanchard, Moissy-Cramayel (FR); Nicolas Jean-Marc Marcel Beauquin, Moissy-Cramayel (FR); Alain Dominique Gendraud, Moissy-Cramayel (FR); Olivier Renon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 60 days.

(21) Appl. No.: 17/634,159

(22) PCT Filed: Aug. 4, 2020

(86) PCT No.: PCT/FR2020/051432

§ 371 (c)(1),
(2) Date: Feb. 9, 2022

(87) PCT Pub. No.: WO2021/028634

PCT Pub. Date: Feb. 18, 2021

(65) Prior Publication Data

US 2022/0290579 A1 Sep. 15, 2022

(30) Foreign Application Priority Data

Aug. 9, 2019 (FR) ....................................... 1909095

(51) Int. Cl.
*F01D 25/14* (2006.01)
*F01D 25/12* (2006.01)

(52) U.S. Cl.
CPC ............. *F01D 25/14* (2013.01); *F01D 25/12* (2013.01); *F05D 2220/30* (2013.01); *F05D 2240/14* (2013.01); *F05D 2260/213* (2013.01)

(58) Field of Classification Search
CPC ........... F05D 2220/30; F05D 2260/213; F01D 11/24; F01D 25/12; F01D 25/14
See application file for complete search history.

(56) References Cited

U.S. PATENT DOCUMENTS 2,085,291 A * 6/1937 Boileau .................... A23G 9/16
62/203
5,399,066 A 3/1995 Ritchie et al.
(Continued)

FOREIGN PATENT DOCUMENTS

CN 103930722 A * 7/2014 .............. F23R 3/002
EP 1 205 637 A1 5/2002
(Continued)

OTHER PUBLICATIONS

CN-103930722-A ( Buse et al.; Jul. 2014) English Translation (Year: 2023).*
(Continued)

*Primary Examiner* — J. Todd Newton
*Assistant Examiner* — Aye S Htay
(74) *Attorney, Agent, or Firm* — Cozen O'Connor

(57) ABSTRACT

The invention relates to an assembly (25) for a turbomachine turbine comprising a casing (18) including an annular wall (26) extending about an axis, and means of cooling the casing (18), the said means of cooling comprising a collector housing (22) and at least one tube (23) extending circumferentially around the annular wall (26) of the casing (18) and connected to the housing (22), with the tube (23) comprising cooling-air ejection orifices.

14 Claims, 4 Drawing Sheets

(56) References Cited

U.S. PATENT DOCUMENTS

| | | | | |
|---|---|---|---|---|
| 7,597,537 | B2 * | 10/2009 | Bucaro | F01D 11/24<br>415/173.2 |
| 2002/0053837 | A1 * | 5/2002 | Arilla | F01D 11/24<br>310/58 |
| 2014/0030066 | A1 * | 1/2014 | Schimmels | F01D 11/24<br>415/116 |
| 2015/0345328 | A1 * | 12/2015 | Prestel | F01D 25/12<br>415/116 |
| 2016/0003086 | A1 * | 1/2016 | Day | F01D 11/24<br>415/136 |
| 2018/0216488 | A1 * | 8/2018 | Bunel | F01D 25/12 |
| 2019/0226357 | A1 * | 7/2019 | Beauquin | F01D 9/06 |

FOREIGN PATENT DOCUMENTS

| | | | |
|---|---|---|---|
| EP | 2 960 441 | A1 | 12/2015 |
| FR | 3 021 700 | A1 | 12/2015 |

OTHER PUBLICATIONS

International Patent Application No. PCT/FR2020/051432, International Search Report and Written Opinion dated Nov. 24, 2020, 10 pgs.

French Patent Application No. 1909095; Search Report dated Apr. 16, 2020; 10 pgs.

* cited by examiner

-- Prior Art --

-- Prior Art --

-- Prior Art --

ASSEMBLY FOR A TURBOMACHINE TURBINE

CROSS-REFERENCE TO RELATED APPLICATIONS

This application is a 35 U.S.C. § 371 filing of International Application No. PCT/FR2020/051432 filed Aug. 4, 2020, which claims the benefit of priority to French Patent Application No. 1909095 filed Aug. 9, 2019, each of which is incorporated herein by reference in its entirety.

TECHNICAL FIELD OF THE INVENTION

The present invention relates to an assembly for a turbomachine turbine, such as for example a double-flow turbomachine.

PRIOR ART

FIG. 1 shows a double-flow, twin-engine turbomachine 1. The axis of the turbomachine is referenced X and corresponds to the axis of rotation of the rotating parts. In the following, the terms "axial" and "radial" are defined in relation to the X axis.

The turbomachine 1 has, from upstream to downstream in the direction of gas flow, a fan 2, a low-pressure compressor 3, a high-pressure compressor 4, a combustion chamber 5, a high-pressure turbine 6 and a low-pressure turbine 7.

The air from the fan 2 is divided into a primary flow 8 flowing into a primary annular vein 9, and a secondary flow 10 flowing into a secondary annular vein 11 surrounding the primary annular vein 10.

The low-pressure compressor 3, the high-pressure compressor 4, the combustion chamber 5, the high-pressure turbine 6 and the low-pressure turbine 7 are located in the primary vein 9.

The rotor of the high-pressure turbine 6 and the rotor of the high-pressure compressor 4 are coupled in rotation via a first shaft 12 in order to form a high-pressure body.

The rotor of the low-pressure turbine 7 and the rotor of the low-pressure compressor 3 are coupled in rotation via a second shaft 13 in order to form a low-pressure body, the fan 2 being able to be connected directly to the rotor of the low-pressure compressor 3 or via an epicyclic gear train for example.

As is best seen in FIG. 2, the low-pressure turbine 7 comprises in particular different successive stages comprising impellers 14 and stationary parts. Each impeller has a disc 15 on which blades 16 are mounted. The ends of the blades 16 are surrounded by a fixed ring 17 of abradable material, the said ring 17 being attached to the turbine casing 18. Valves 19 are located downstream of the impellers 14. The valves 19 and rings 17 are mounted to the casing via flanges or hooks 20 extending from the radially inner surface of the casing 18.

In order to guarantee a high efficiency for the turbomachine, the air flow not passing through the impellers 14 of the individual stages must be limited, i.e. leaks between the radially outer ends of the blades 16 and the ring 17 made of abradable material must be limited. To do this, the clearance must be checked at this interface, as this clearance is dependent on the temperature of the casing 18, and in particular on the areas of the said casing 18 containing the hooks or the flanges 20 supporting the ring 17.

The primary air flow from the combustion chamber 5 is hot and heats the downstream parts, such as the stationary and mobile parts of the turbine 6, 7.

In order to control the above-mentioned backlash and to avoid premature degradation of the various stationary and moving parts of the turbine, it is necessary to provide efficient means of cooling that can be easily integrated into the environment of the turbomachine.

Patent application FR 3 021 700, on behalf of the Applicant, discloses a cooling device 21 for a casing 18 of a low-pressure turbine 7, shown in FIG. 3, comprising collector housings 22 with each collector housing 22 extending axially.

The device 21 further comprises tubes 23 extending circumferentially on either side of the collector housings 22. These tubes 23, also called ramps, are formed by curved pipes of circular cross-section, each tube 23 extending circumferentially around the casing for example at an angle of about 90°. A plurality of fixing plates 24 hold the plurality of tubes 23 in position.

Each tube 23 has an air inlet opening out into the corresponding collector housing 22 and a closed distal end. Each tube 23 also comprises a cylindrical wall with air-ejection orifices facing the casing 18, so that the cooling air can enter the collector housings 22 and then the tubes 23 before opening out through the orifices opposite the casing 18, so as to cool it. This is known as impact cooling because the air impacts the casing 18.

The radially inner part of the housing also has air-ejection orifices facing the casing and intended for its cooling.

Each housing 22 is attached, at its upstream end, to an upstream flange of the casing, using an upstream attachment member and, at its downstream end, to a downstream flange of the casing using a downstream attachment member. The attachment members can be formed by sheets screwed to the corresponding flanges.

During operation, the temperature of a part of the casing, especially the upstream part, is higher than the temperature of the flanges to which the housings are attached. High temperatures cause axial and radial expansion. Due to temperature differences between the flanges and the hotter areas of the casing, there are differential expansion phenomena that can cause contact between the tubes and the casing. In order to avoid such contact, and therefore degradation of the cooling device, the tubes are spaced radially from the casing, which tends to reduce the efficiency of the impact cooling and/or requires high cooling-air flow rates. which reduces the efficiency of the turbomachine.

Furthermore, the housings are attached through numerous parts, which generates a significant chain of dimensions, increasing the dimensional tolerances required for mounting the housing. Such tolerances tend to increase the radial spacing or air gap between the tubes and the casing.

One aim of the invention is to provide a simple, effective and economical solution to these problems.

DISCLOSURE OF THE INVENTION

For this purpose, it proposes an assembly for a turbomachine turbine comprising a casing including an annular wall extending around an axis, and means of cooling the casing, the said means of cooling comprising a collector housing and at least one tube extending circumferentially around the annular wall of the casing and connected to the housing, the at least one tube comprising cooling-air ejection orifices, characterised in that the casing comprises at least two attachment bosses extending radially outwards from the annular wall of the casing, the said bosses being circumferentially spaced from one another, the housing comprising at least two upstream attachment areas attached respectively to said bosses using upstream means of attachment and at least one downstream attachment area attached to the housing using downstream means of attachment, at least some of the means of attachment allowing a relative movement in the axial direction and/or in the circumferential direction between the attachment area of the housing and the boss or between the attachment area of the housing and the casing.

Such a structure makes it possible to reduce the chain of dimensions between the housing and the casing, so as to control the positioning of the casing and of the tube or tubes in relation to the casing. Furthermore, the bosses are placed at the level of the annular wall of the casing and not at the level of the flanges, so that the housing is attached in hotter areas of the casing. The housing, and thus the tube(s) connected to the housing, are thus moved together with the annular wall in operation, when this wall expands, in particular in the radial direction. This avoids the risk of contact between the tube(s) and the annular wall of the casing.

This allows for better control of the cooling of the casing and prevents premature damage.

Furthermore, such an assembly can be easily dismantled for maintenance. In particular, such an assembly can be removed from the casing without requiring the casing to be removed from the rest of the turbomachine.

Furthermore, the terms "upstream" and "downstream" are defined in relation to the direction of flow of the gas flow within the turbomachine or the turbine.

The terms "axial", "radial" and "circumferential" are defined in relation to the axis of the casing, which coincides with the axis of the turbine or turbomachine.

Each boss can be formed by at least one separate part of the annular wall of the casing and is attached to the said annular wall.

The attachment, of the said separate part forming the boss, onto the annular wall of the casing can be achieved by screwing or riveting.

The boss can comprise a projecting part extending radially outwards from an attachment plate, the said plate being attached to the annular wall of the casing.

The said projecting part can be cylindrical.

The attachment area can come to bear on the radially outer end of the corresponding boss. Each attachment area can be integral with the rest of the housing or can be formed by a separate element, attached to the rest of the housing, for example by welding.

The housing can have a first attachment area and a second attachment area located circumferentially on either side of the housing.

The first attachment area and the second attachment area can be located in the same radial plane.

The first attachment area and the second attachment area can extend axially between tubes connected to the housing.

Each upstream means of attachment can comprise an insert mounted in a recess of a corresponding boss, the said upstream means of attachment comprising a connecting member which, when connected, connects the attachment area and the insert. The insert can thus be easily replaced in case of wear or of loss of the insert's self-locking capability.

It is possible for the radially inner end of the recess to not open out into the internal volume of the casing so as to prevent the insert from falling into the casing by gravity, for example during mounting. Such a feature also ensures a seal with the interior of the casing.

The insert can comprise an external threading engaged in an internal tapping formed in the recess of the boss, the insert being prevented from rotating in relation to the boss.

In this way, the insert can be easily mounted or replaced.

The insert can be crimped in the recess of the boss.

Such a crimp can be achieved by deforming a radially outer part of the insert.

Alternatively, a pin can be used to prevent the insert from rotating inside the recess of the boss.

The connecting member can be a screw, which cooperates with an internal threading of the insert.

The connecting member and/or the insert can include means of self-locking.

The means of self-locking are, for example, achieved by deforming the threads of the internal tapping of the insert and/or the threads of the screw, so as to exert a resisting braking torque after the screw has been screwed into the tapping of the insert.

At least some of the said means of attachment can comprise at least one elastic member for connecting an attachment area of the housing to a boss or to the casing, Each upstream means of attachment can comprise a support member integral with the boss and comprising a support rim located radially outside an attachment area of the housing, the elastic member being a compression member mounted radially between the support member and the attachment area of the housing.

The elastic member is, for example, a helical compression spring.

The support member is for example a sleeve comprising a cylindrical part mounted around the connecting member, and an annular support rim extending perpendicularly to the cylindrical part. The support member can have a shoulder coming to bear radially on an enlarged head of the connection member, directly or indirectly, for example via a washer.

In a general manner, the various supports can be carried out directly or indirectly, that is to say through an additional element.

A washer can be mounted between the elastic member and the attachment area.

The upstream means of attachment can comprise at least one wear spacer mounted radially between an attachment area of the housing and a corresponding boss.

The presence of such a spacer prevents or limits damage to the corresponding boss. Such a spacer can be easily changed if necessary.

At least one upstream attachment area can have an oblong hole, extending circumferentially, for the passage of a connecting member which connects the corresponding upstream attachment area to a boss.

Each upstream attachment area can have an oblong hole, extending circumferentially, for the passage of a connecting member connected to the corresponding upstream attachment area and to the corresponding boss.

The presence of an oblong hole makes it possible to allow the attachment area to move in the circumferential direction in relation to the corresponding boss and thus compensate for any differential expansion phenomena between the housing and the annular wall of the casing, which is hotter than the housing in operation. Of course, other embodiments are also possible. For example, at least one of the upstream attachment areas can have a diameter or circumferential dimension larger than the diameter or circumferential dimension of the corresponding connecting member.

The downstream attachment area can have an oblong hole, extending axially, for the passage of a connecting member that connects the downstream attachment area to the casing.

The presence of an oblong hole makes it possible to allow the attachment area to move in the axial direction in relation to the corresponding boss and thus compensate for any differential expansion phenomena between the housing and the annular wall of the casing, which is hotter than the housing in operation. Of course, other embodiments are also possible. For example, the downstream attachment area can have a diameter or axial dimension larger than the diameter or axial dimension of the corresponding connecting member.

The downstream attachment area of the housing can be connected to a downstream boss or to a part that is stationary in relation to the casing, for example an attachment member or plate attached to a downstream flange of the casing.

The connecting member of the downstream means of attachment can be a screw, cooperating with a nut. The nut can be self-locked.

A washer can be mounted radially between the nut and the attachment area of the housing. The downstream means of attachment comprise a support member integral with the casing and comprising a support rim located radially outside the corresponding attachment area of the housing, an elastic member formed by a compression member being mounted radially between the support member and the attachment area of the housing.

The invention also concerns a turbine or turbomachine equipped with such an assembly. The invention also relates to an aircraft comprising a turbomachine of the above type.

DETAILED DESCRIPTION OF THE INVENTION

Figure 1:
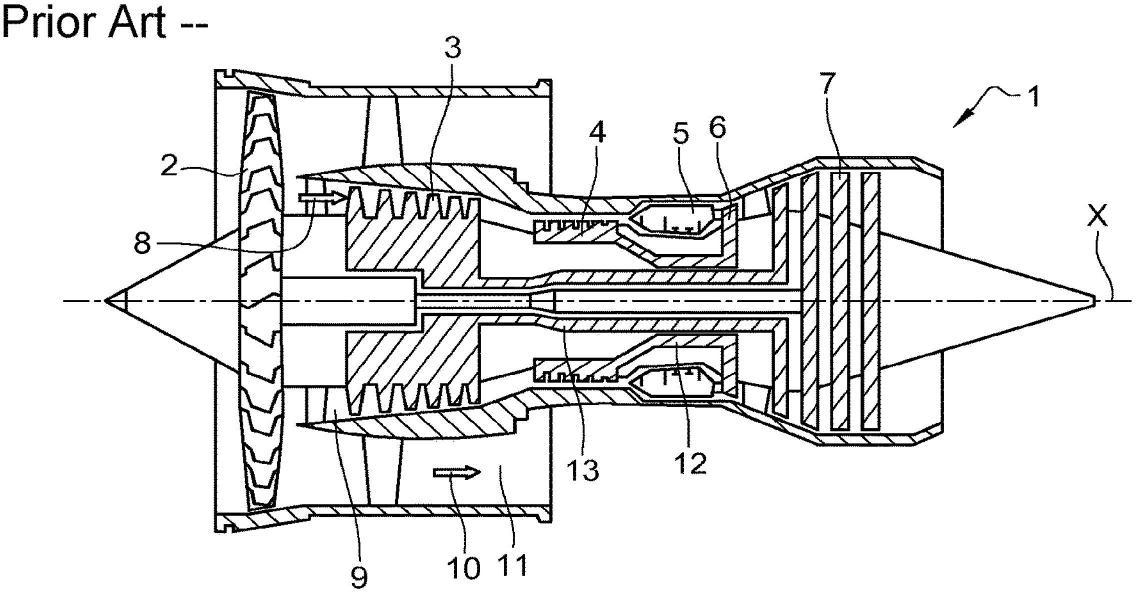
FIG. 1 is an axial sectional view of a double-flow turbojet engine of the prior art.
Figure 2:
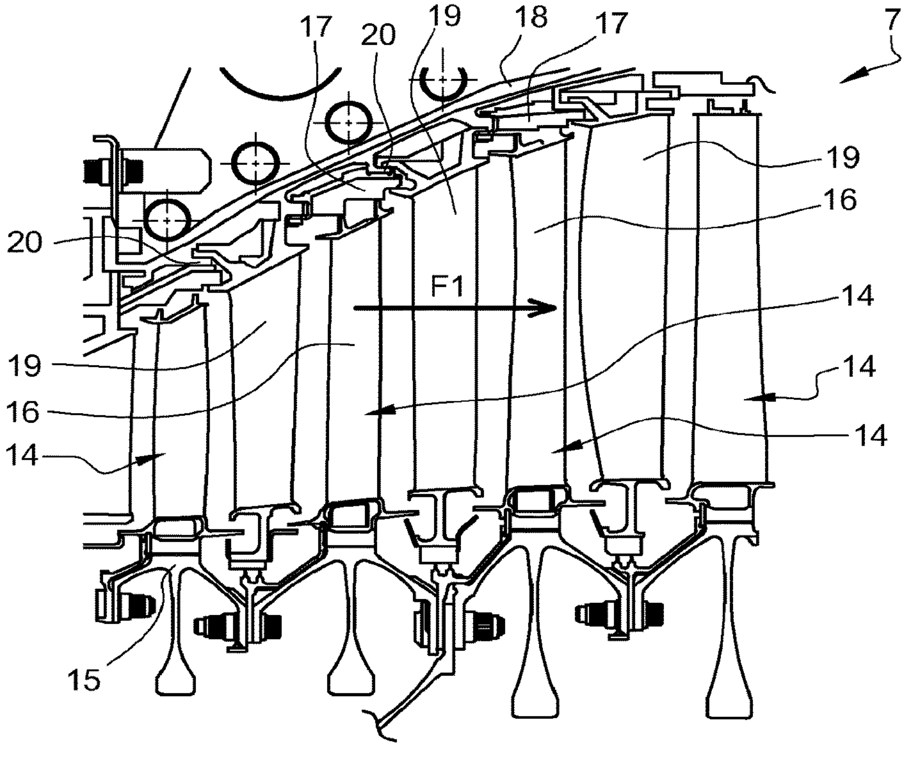
FIG. 2 is an axial cross-sectional view of part of the turbojet engine of the prior art, showing in particular the low-pressure turbine.
Figure 3:
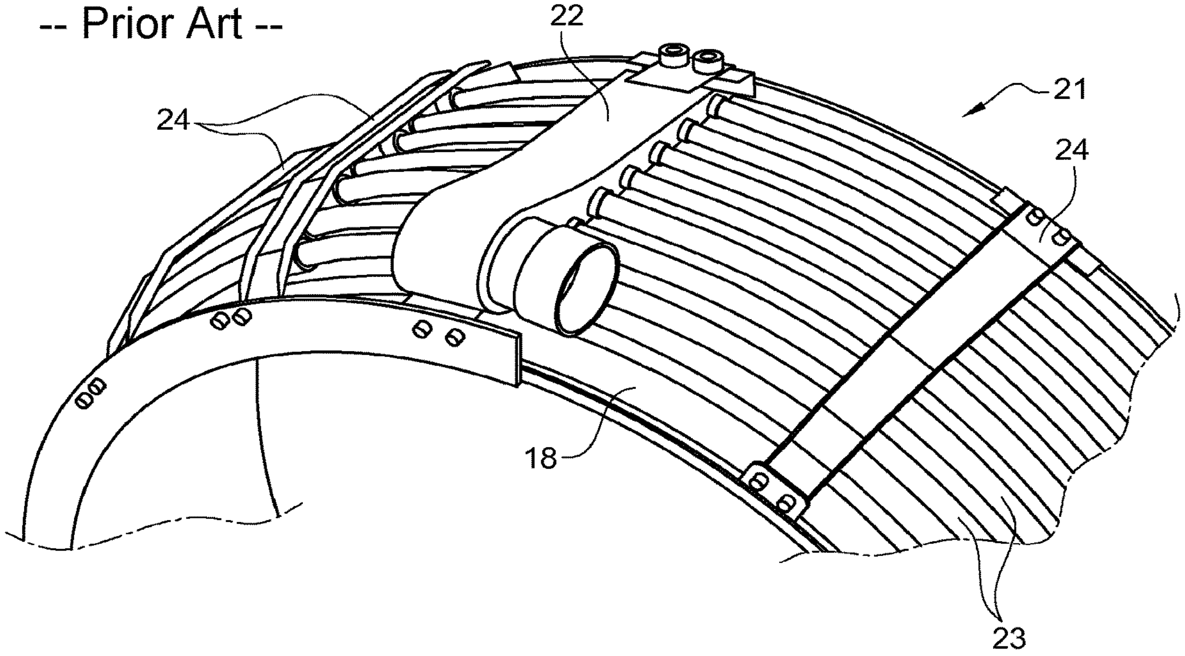
FIG. 3 is a perspective view of part of the means of cooling of the casing and of the casing of the prior art.

FIGS. 4 to 9 illustrate an assembly 25 for a turbomachine turbine 7, according to a first embodiment of the invention. This assembly 25 comprises a turbine casing 18 comprising an annular wall 26 extending about an axis X. The casing 18 further comprises annular flanges 27, 28 extending radially outwardly from the upstream and downstream axial ends of the annular wall 18. Bosses 29 extend radially outwards from the annular wall of the casing 18. The bosses 29 are made by means of separate parts of the annular wall 26.

The bosses 29 are here arranged in pairs, the two bosses 29 of the same pair being located on the same radial plane and are located in an upstream area of the casing 18. In particular, the bosses 29 are offset axially downstream in relation to the upstream flange, so as to be located in an area of high operating temperatures. The bosses 29 are for example located opposite the second stage of the turbine 7.

Each boss 29 has a projecting part 29*a,* e.g. cylindrical, extending radially outward from an attachment plate 29*b* in which holes 29*c* are formed. The plate 29*b* is screwed to the annular wall 26 by means of screws 29*d* and nuts 29*e.* The screws 29*d* have enlarged heads 29*f* coming to bear on the radially internal surface of the casing, the nuts 29*e* coming to bear on the radially outer surface of the plate 29*b.* The nuts 29*e* can be self-locked.

The radially outer end 30 (FIG. 5) of each projecting part 29*a* forms a flat surface. A cylindrical recess 31 is formed in each boss 29, said recess 31 opening at the radially outer end 30 of the recess 31. The recess 31 has an internal tapping.

The assembly 25 further comprises means of cooling the casing 18 comprising axially extending collector housings 22, for example two in number, extending axially and each comprising a radially external air inlet 32. Each housing 22 is hollow and extends axially, with the air inlet 32 opening out into the said housing 22.

Each housing 22 has two upstream connection areas 33, located circumferentially on either side of the housing 22, and a downstream connection area 34.

Figure 4:
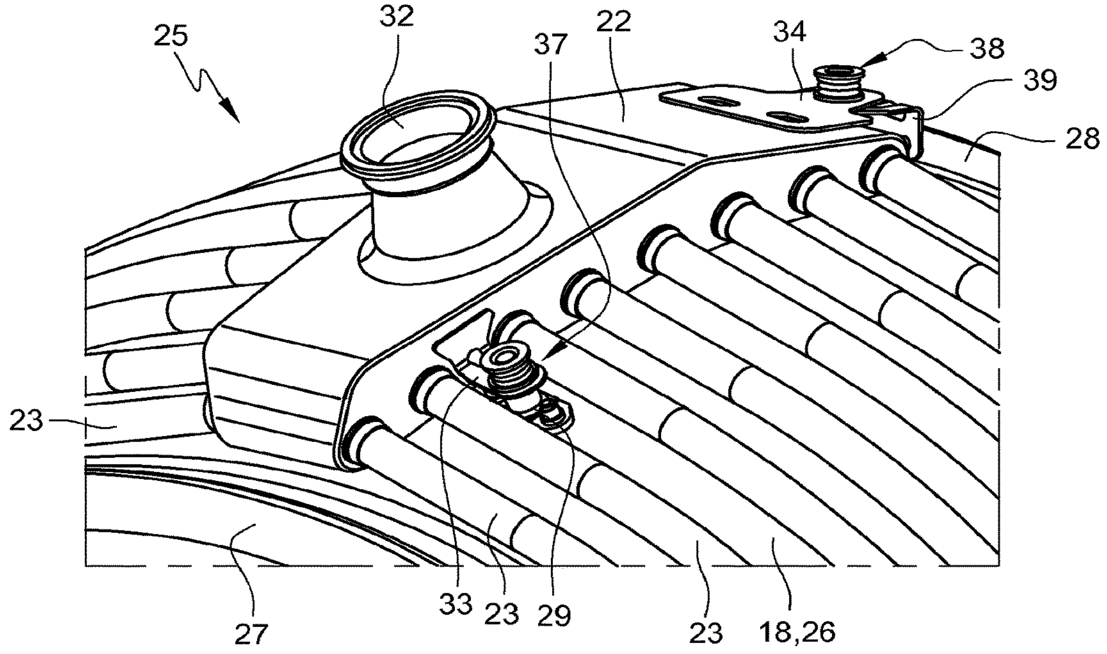
FIG. 4 is a perspective view of part of an assembly comprising a casing and means of cooling the casing, according to one embodiment of the invention.
Figure 5:
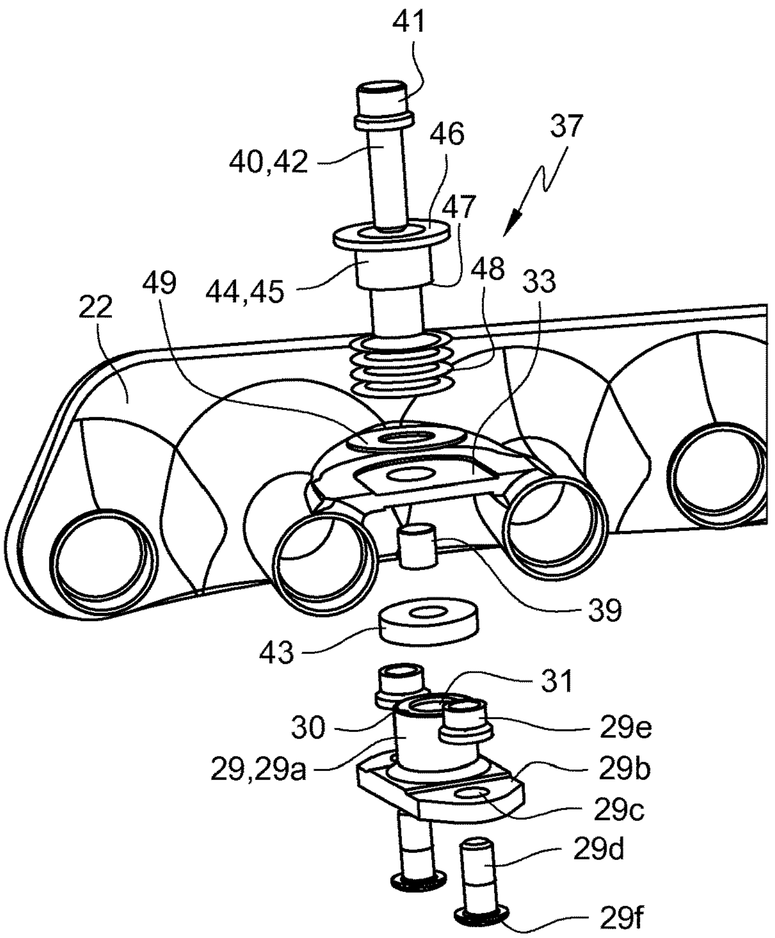
FIG. 5 is an exploded perspective view of part of an assembly according to the invention, the tubes not being shown.
Figure 6:
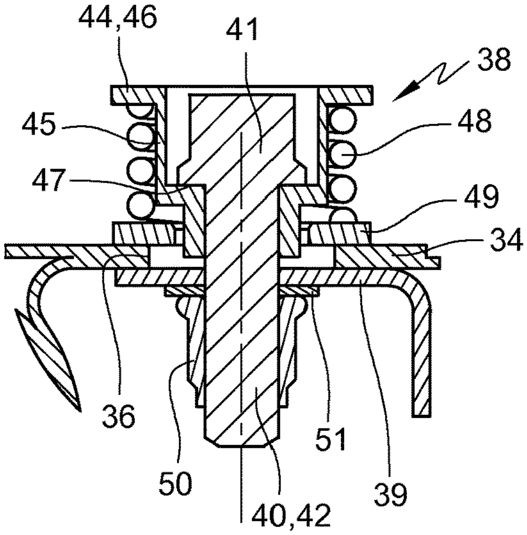
FIG. 6 is a cross-sectional view of the downstream means of attachment, in a first position of the attachment area in relation to the casing.

Each connection area 33, 34 can be formed by a member separate from and attached to the rest of the housing 22, as shown in FIG. 4. Alternatively, each connection area 33, 34 can be made in one piece with the rest of the housing 22, as shown in FIGS. 5 and 8 in the case of the upstream connection areas 33.

Figure 8:
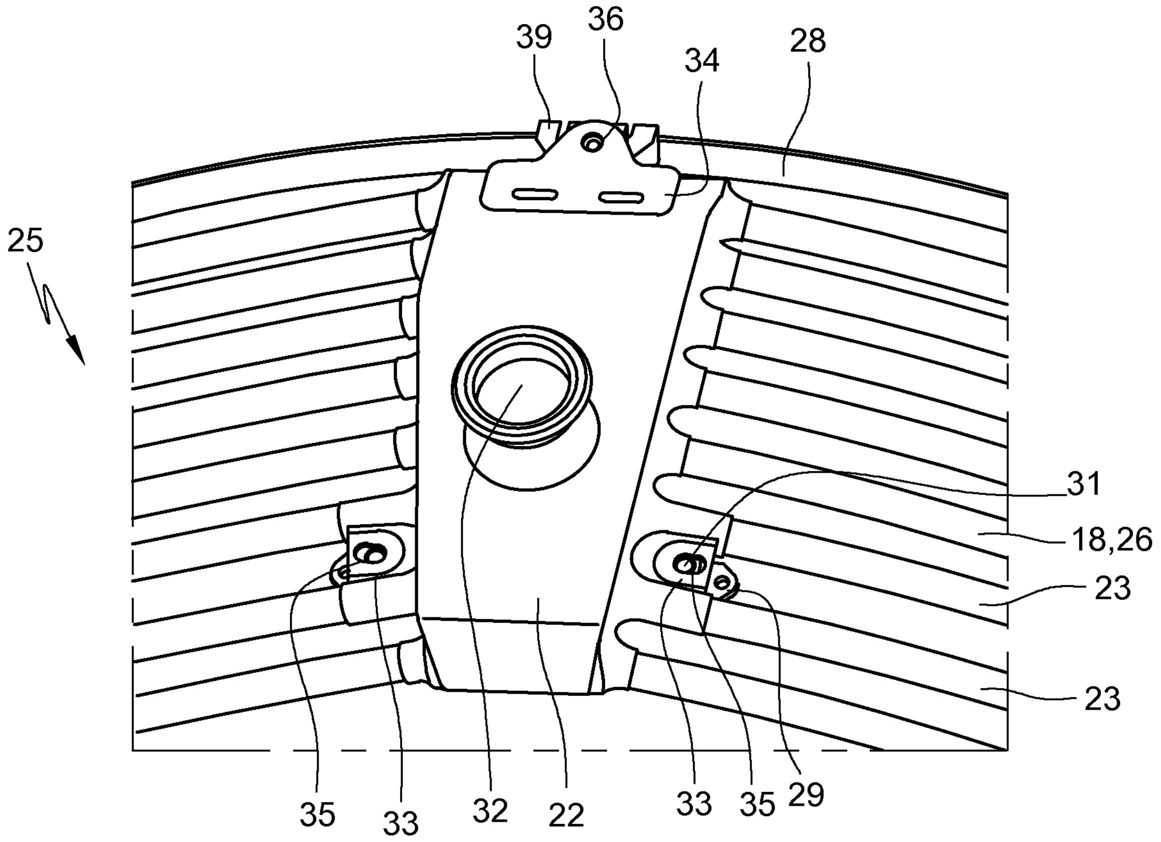
FIG. 8 is a perspective view of a part of an assembly according to the invention, the means of attachment not being visible in this figure.
Figure 9:
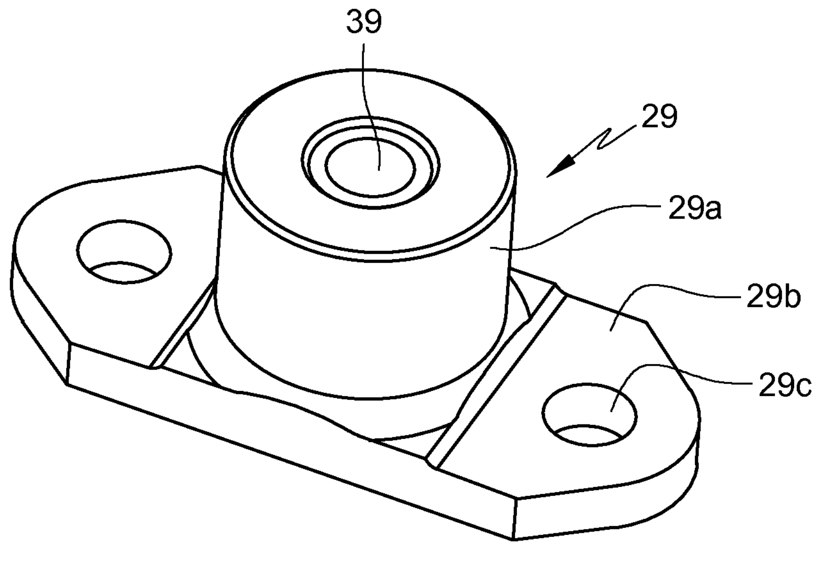
FIG. 9 is a perspective view of a boss in which an insert is mounted.

Each upstream connection area 33 has a circumferentially extending part in which an oblong hole 35 extending in the circumferential direction is formed (FIG. 8).

The downstream connection area 34 comprises a part extending axially, in which an oblong hole 36 extending in the axial direction is formed.

The means of cooling further comprises tubes 23, also called ramps, formed by curved pipes of circular cross-section, each tube 23 extending at an angle of approximately 90°.

Each tube 23 has an air inlet opening out into the corresponding collector 22 housing and a closed distal end. Each tube 23 also comprises a cylindrical wall with air-ejection orifices facing the casing 18, i.e. radially inwards, so that the cooling air entering the housing 22 through the inlet, flows through the tubes 23 before opening out through the orifices opposite the casing 18, so as to cool it by impact.

The two housings 22 can be diametrically opposed, each housing 22 being associated with a plurality of pairs of tubes 23, namely tubes 23 extending circumferentially on one side and tubes 23 extending circumferentially on the opposite side. Thus, each housing 22 and the associated opposed tubes 23 can cover an angular range of, for example, approximately 180°. Naturally, the number of housings can vary depending on the application. In the embodiment shown in the figures, each housing 22 is associated with several pairs of tubes 23, for example eight pairs of tubes 23. The tubes 23 of the same pair are located on the same radial plane, the tubes 23 of different pairs being offset from each other along the X axis of the turbomachine.

The two housings 22 and the associated pairs of tubes 23 have substantially identical structures and are arranged diametrically opposite each other.

In this way, the tubes 23 are located on several radial planes axially offset from each other, the tubes 23 of the same radial plane forming a cooling ring surrounding the casing 18 which extends substantially over the entire periphery of the casing 18, i.e. substantially 360°.

The orifices are distributed in such a way that there is an almost constant convective exchange of air over the entire length of the tube 23, so as to ensure even cooling of the casing 18.

Each upstream connection area 33 is connected to the corresponding boss 29 via upstream means of attachment 37.

Each downstream connection area 34 is connected via downstream means of attachment 38 to a generally L-shaped intermediate attachment member 39.

The upstream means of attachment 37 comprise, for each upstream connection area 33:

- an insert 39 (FIG. 5) with an external threading and an internal tapping. The insert 39 is screwed into the tapped recess 31 of the corresponding boss 29 and is crimped onto the said boss 29. The internal threading of the insert 39 is of the self-locking type.
- a screw 40 comprising an enlarged head 41, radially external, and a threaded part 42, radially internal, screwed into the insert 39,
- a wear spacer 43 mounted radially between the radially internal surface of the attachment area 33, and the flat end 30 of the boss 29,
- a support member in the form of a sleeve 44 comprising a cylindrical part 45 mounted around the screw 40, and an annular support rim 46 extending perpendicularly to the cylindrical part 45 from the radially outer end of the cylindrical part 45. The cylindrical part 45 has two areas of different diameters delimiting a shoulder 47 used for radial support on the enlarged head 41 of the screw 40.
- an elastic member 48 formed by a helical compression spring 48 surrounding the cylindrical part of the support member 44. The radially outer end of the compression spring 48 is supported radially on the support rim 46 of the support member 44. The radially inner end of the compression spring 48 is supported radially on the upper surface of the attachment area 33, for example using a washer 49. The radial force exerted by the elastic member 48 thus tends to press the attachment area 33 radially (indirectly) against the radially outer end 30 of the corresponding boss 29.

The downstream means of attachment 38 comprise:

- a screw 40 comprising an enlarged head 41, radially external, and a threaded part 42, radially internal,
- a self-locking nut 50 cooperating with the threaded part 42 of the screw 40, the nut 50 being supported on the radially internal surface of the intermediate attachment member 39, using a washer 51. The intermediate attachment member 39 is attached to the downstream flange 28.
- a support member 44 in the form of a sleeve comprising a cylindrical portion 45 mounted around the screw 40, and an annular bearing support rim 46 extending perpendicular to the cylindrical portion 45 from the radially outer end of the cylindrical portion 45. The cylindrical part 45 has two areas of different diameters delimiting a shoulder 47 used for radial support on the enlarged head 41 of the screw 40.
- an elastic member 48 formed by a helical compression spring 48 surrounding the cylindrical part 45 of the support member 44. The radially outer end of the compression spring 48 is supported radially on the support rim 46 of the support member 44. The radially inner end of the compression spring 48 is supported radially on the upper surface of the attachment area 34, for example using a washer 49. The radial force exerted by the resilient member 48 thus tends to press the downstream attachment area 34 against the radially outer surface of the intermediate attachment member 39.

Such a structure makes it possible to reduce the chain of dimensions between the housing 22 and the casing 18, so as to control the positioning of the housing 22 and the tubes 23 in relation to the casing 18. Furthermore, the bosses 29 are placed at the level of the annular wall 26 of the casing 18 and not at the level of the flanges 27, 28, so that the housing 22 is attached in hotter areas of the casing 18. The housing 22, and thus the tube(s) 23 connected to the housing 22, are thus moved together with the annular wall 26 in operation, when this wall 26 expands, in particular in the radial direction. This avoids the risk of contact between the tube(s) 23 and the annular wall 26 of the casing 18.

This allows for better control of the cooling of the casing 18 and prevents premature damage.

The presence of oblong holes 35, 36 makes it possible to allow movement in the circumferential direction and in the axial direction of the corresponding attachment area 33, 34 in relation to the casing 18 and thus to compensate for any differential expansion phenomena between the housing 22 and the casing 18, which is hotter than the housing 22 in operation.

Figure 7:
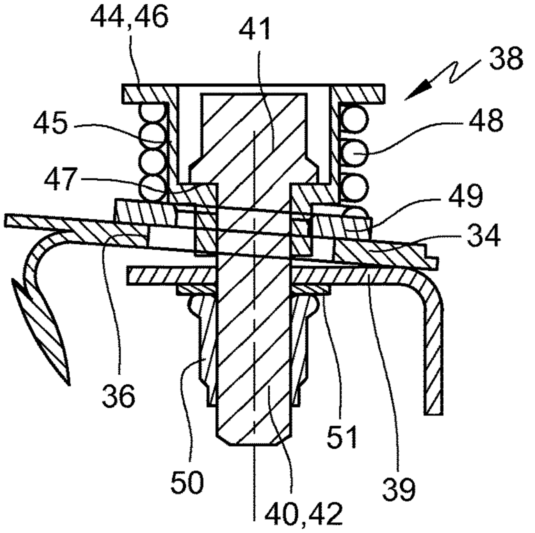
FIG. 7 is a cross-sectional view of the downstream means of attachment, in a first position of the attachment area in relation to the casing.

Furthermore, the upstream 37 and downstream 38 means of attachment allow an angular offset between the attachment areas 33, 34 and the bosses 29 or the intermediate fastening element 39, as shown in FIG. 7.

Of course, other embodiments are also possible.

The invention claimed is:

1. An assembly for a turbomachine turbine comprising:

- a casing including an annular wall extending about an axis and at least two attachment bosses extending radially outwardly from the annular wall of the casing, said at least two attachment bosses being circumferentially spaced from each other, and
- means of cooling the casing, said means of cooling comprising:
  - a collector housing comprising at least two upstream attachment areas which are each attached to a corresponding attachment boss of the at least two attachment bosses by upstream means of attachment and at least one downstream attachment area attached to the casing by downstream means of attachment; and
  - at least one tube extending circumferentially around the annular wall of the casing and connected to the collector housing, the at least one tube having cooling-air ejection orifices,
- wherein at least one of the upstream means of attachment or the downstream means of attachment allow relative movement in an axial direction and/or in the circumferential direction between the corresponding attachment area of the collector housing and the corresponding attachment boss or between the corresponding attachment area of the collector housing and the casing, and in that each upstream means of attachment attached to an upstream attachment area comprises an insert mounted in a recess of the attachment boss, wherein each of the upstream means of attachment comprises a connecting member which connects the upstream attachment area to the corresponding attachment boss, the connecting member being a screw, cooperating with an internal tapping of the insert, wherein each upstream means of attachment comprises a support member integral with the corresponding attachment boss and the support member comprising a support rim situated radially outside the corresponding upstream attachment area of the collector housing, an elastic member being a compression member mounted radially between the support member and the corresponding upstream attachment area of the collector housing.

2. The assembly according to claim 1, wherein each attachment boss is formed by at least one part separate from the annular wall of the casing and is attached to the annular wall.

3. The assembly according to claim 1, wherein the insert comprises an external threading engaged in an internal tapping formed in the recess of the corresponding attachment boss, the insert being prevented from rotating in relation to the corresponding attachment boss.

4. The assembly according to claim 3, wherein each of the upstream means of attachment comprises at least one wear spacer mounted radially between the corresponding upstream attachment area of the collector housing and the corresponding attachment boss.

5. The assembly according to claim 1, wherein the connecting member and/or the insert comprises means of self-locking.

6. The assembly according to claim 1, wherein each of the upstream means of attachment comprises at least one wear spacer mounted radially between the upstream attachment area of the collector housing and the corresponding attachment boss.

7. The assembly according to claim 1, wherein each upstream attachment area comprises an oblong hole extending circumferentially used for passage of the connecting member which connects the upstream attachment area to the corresponding attachment boss.

8. The assembly according to claim 1, each downstream attachment area comprises an oblong hole extending axially used for passage of a connecting member which connects the downstream attachment area to the casing.

9. An assembly for a turbomachine turbine comprising:

a casing including an annular wall extending about an axis and at least two attachment bosses extending radially outwardly from the annular wall of the casing, said at least two attachment bosses being circumferentially spaced from each other, and means of cooling the casing, said means of cooling comprising:

a collector housing comprising at least two upstream attachment areas which are each attached to a corresponding attachment boss of the at least two attachment bosses by upstream means of attachment and at least one downstream attachment area attached to the casing by downstream means of attachment; and at least one tube extending circumferentially around the annular wall of the casing and connected to the collector housing, the at least one tube having cooling-air ejection orifices, wherein at least one of the upstream means of attachment or the downstream means of attachment allow relative movement in an axial direction and/or in the circumferential direction between the corresponding attachment area of the collector housing and the corresponding attachment boss or between the corresponding attachment area of the collector housing and the casing, and in that each upstream means of attachment attached to an upstream attachment area comprises an insert mounted in a recess of the attachment boss, wherein each of the upstream means of attachment comprises a connecting member which connects the upstream attachment area to the corresponding attachment boss, the connecting member being a screw, cooperating with an internal tapping of the insert, wherein the insert comprises an external threading engaged in an internal tapping formed in the recess of the corresponding attachment boss, the insert being prevented from rotating in relation to the corresponding attachment boss, wherein each upstream means of attachment comprises a support member integral with the corresponding attachment boss and the support member comprising a support rim situated radially outside the corresponding upstream attachment area of the collector housing, an elastic member being a compression member mounted radially between the support member and the corresponding upstream attachment area of the collector housing.

10. The assembly according to claim 9, wherein each attachment boss is formed by at least one part separate from the annular wall of the casing and is attached to the annular wall.

11. The assembly according to claim 9, wherein the connecting member and/or the insert comprises means of self-locking.

12. The assembly according to claim 9, wherein each of the upstream means of attachment comprises at least one wear spacer mounted radially between the upstream attachment area of the collector housing and the corresponding attachment boss.

13. The assembly according to claim 9, wherein each upstream attachment area has an oblong hole extending circumferentially used for passage of the connecting member which connects the upstream attachment area to the corresponding attachment boss.

14. The assembly according to claim 9, wherein each downstream attachment area has an oblong hole extending axially used for passage of the connecting member which connects the downstream attachment area to the casing.

* * * * *